Figure 1:
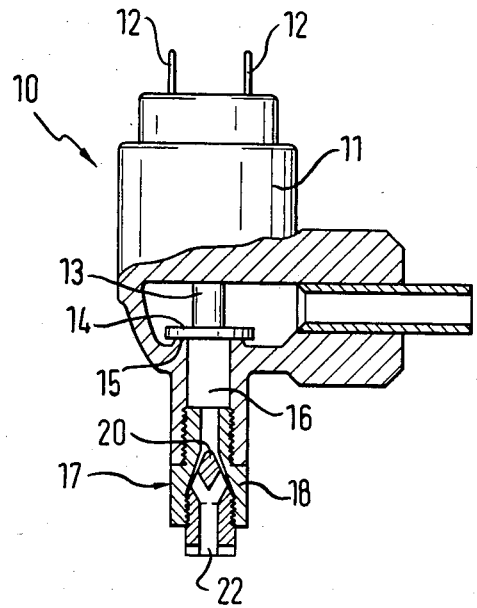

United States Patent [19]

Färber et al.

[11] Patent Number: 4,748,998
[45] Date of Patent: Jun. 7, 1988

[54] SHUT-OFF VALVE, ESPECIALLY FOR PRESSURIZED CARBONATED LIQUIDS IN AUTOMATIC BEVERAGE DISPENSERS OR THE LIKE

[75] Inventors: Karlheinz Färber, Giengen; Hartmann Nelzow, Berlin; Wolfgang Giebner, Giengen, all of Fed. Rep. of Germany

[73] Assignee: Bosch-Siemens Hausgeräte GmbH, Munich, Fed. Rep. of Germany

[21] Appl. No.: 431,310

[22] Filed: Sep. 30, 1982

[30] Foreign Application Priority Data

Dec. 2, 1981 [DE] Fed. Rep. of Germany ....... 3147769

[51] Int. Cl.$^4$ .............................................. F16K 21/00
[52] U.S. Cl. .............................. 137/170.1; 137/614.21; 251/351; 251/353
[58] Field of Search ............... 251/350, 351, 352, 353; 137/170.1, 613, 614.21

[56] References Cited

U.S. PATENT DOCUMENTS

| 829,524 | 8/1906 | Happ | 251/350 X |
|---|---|---|---|
| 2,003,532 | 6/1935 | Gloor | 137/170.1 X |
| 3,196,688 | 7/1965 | Smith | 251/351 X |
| 3,727,638 | 4/1973 | Zaremba | 251/351 X |

FOREIGN PATENT DOCUMENTS

| 1311109 | 10/1962 | France | 251/351 |
|---|---|---|---|
| 2033550 | 5/1980 | United Kingdom | 251/351 |

Primary Examiner—Alan Cohan
Attorney, Agent, or Firm—Herbert L. Lerner; Laurence A. Greenberg

[57] ABSTRACT

Shut-off valve especially for pressurized carbonated liquids in automatic beverage dispensers or the like, with an expansion device connected thereto in the form of a hollow-cone-like diffusor, in which an expansion cone is arranged which can be adjusted in the axial direction and the taper of which corresponds at least approximately to the taper of the diffusor, characterized by the feature that the expansion device is arranged in the output of the valve and the expansion cone is provided with several holes which start from its conical surface and open into a central hole which starts from its base.

1 Claim, 1 Drawing Sheet

SHUT-OFF VALVE, ESPECIALLY FOR PRESSURIZED CARBONATED LIQUIDS IN AUTOMATIC BEVERAGE DISPENSERS OR THE LIKE.

The invention relates to a shut-off valve, especially for pressurized carbonated liquids in automatic beverage dispensers or the like, comprising an expansion device connected thereto in the form of a hollow-cone-like diffusor, in which an expansion cone is arranged which is adjustable in the axial direction and the taper of which corresponds at least approximately to the taper of the diffusor.

If shut-off valves of the type mentioned are to be used for dosing and simultaneous decompression of pressurized carbonated liquids to atmospheric pressure, it is necessary that they are followed by an expansion device since otherwise, large quantities of the $CO_2$-gas dissolved in the carbonated liquid will escape into the atmospere due to dissociation. It is therefore customary for such purposes to have the shut-off valve be followed by an expansion device which, in known cases, is designed as a separate part which is connected to the shut-off valve in a pressure-proof manner. These known expansion devices, however, are relatively elaborate and large and therefore require much space and have considerable weight as compared to the shut-off valve. Under the cramped space conditions, which generally prevail in automatic beverage dispensers, they are therefore difficult to accommodate. In addition, they require a relatively large assembly effort.

It is therefore an object of the present invention to simplify, in shut-off valves of the type more specifically defined at the outset, the expansion device and to improve it so that the shut-off valves equipped therewith can be accommodated in the closest quarters and with a minimum of assembly effort in a simple manner. According to the present invention, this problem is solved by the provision that the expansion device is arranged in the output of the valve and the expansion cone thereof is provided with several holes which start at its outer surface and lead into a central hole starting at its base.

By means of the design of the expansion device according to the invention, it is possible to combine the former with the shut-off valve to form an easy-to-handle part which is suitable particularly for installation in automatic beverage dispensers under the crowded space conditions generally prevailing there.

A further advantageous embodiment of the subject of the invention is obtained by the provision that the expansion cone is provided at its base with a threaded insert which can be screwed into an internal thread at the exit of the diffusor.

Due to the design of the expansion cone according to the invention, the position of the latter relative to the hollow-cone-like diffusor can be adjusted by simple rotation, which makes it possible in a particularly simple manner to achieve control of the quantity of the carbonated liquid emerging from the shut-off valve.

Figure 2:
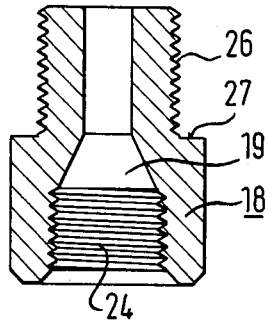
Figure 3:
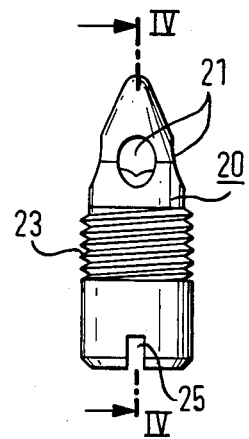
Figure 4:
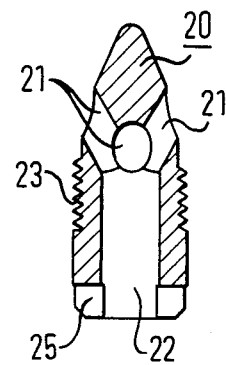

Further advantageous features of the invention, which are characterized in the claims, will be explained in the following description, referring to a shut-off valve, shown simplified in the drawing, with an expansion device disposed in its output, where FIG. 1 shows a shut-off valve designed as an electromagnetically operated corner valve with an expansion device disposed in the outlet thereof, consisting of a hollow-cone diffusor and an expansion cone, partly in cross section;

FIG. 2, the hollow-cone diffusor which can be inserted into the output of the shut-off valve, enlarged over FIG. 1, in cross section;

FIG. 3, the expansion cone which can be screwed into the diffusor, as an individual part, also enlarged, and FIG. 4, a sectional view of the expansion cone according to FIG. 3, taken in the sectional plane indicated by the arrows IV in FIG. 3.

A shut-off valve designated with 10 in FIG. 1 is designed in the form of an electromagnetically operated corner valve with a housing 11, in which a magnet coil (not visible) provided with contact pins 12 is arranged in the usual manner. If the magnetic field is excited, it acts on an armature which lifts a valve disc 14 off a valve seat 15 via a plunger 13 and thereby releases the outlet 16 of the shut-off valve 10.

In the output 16 of the shut-off valve 10, an expansion device 17 is arranged which consists of an insert 18 with a hollow-cone-like diffusor 19 and an expansion cone 20 which is adjustable therein in the axial direction. The taper of the hollow-cone-like diffusor 19 corresponds at least approximately to the taper of the expansion cone 20.

The expansion cone 20 is provided, as will be seen particularly from FIGS. 3 and 4, with holes 21 which start from its outer surface and open into a central hole 22 starting from its base. The expansion cone 20 is furthermore provided at its base with a threaded section 23 which can be screwed into an internal thread 24 in the output of the diffusor 19 in the insert 18. The free end of the threaded section 23 at the expansion cone 20 is furthermore provided with a slot 25, which serves for the form-locking application of a tool, for instance, the blade of a screwdriver.

The insert 18 equipped with the diffusor 19 is designed as a threaded nipple provided with an external thread 26, which has a shoulder 27 approximately at its middle.

As can be seen particularly in FIG. 1, the insert 18 equipped with the diffusor 19 of the expansion device, is connected to the output 16 of the shut-off valve 10 via the thread 26. The expansion cone 20, on the other hand, can be screwed with its threaded section 25 into the internal thread 24 in the insert 18 having the diffusor 19. The expansion cone 20 can be screwed-in in a simple manner by means of a screwdriver blade inserted into the slot 25. Depending on the depth of screwing-in, the gap between the diffusor 19 and the conical surface of the expansion cone can be changed and thus, the passage cross section can be varied.

In a modification of the embodiment example shown and described, it may also be provided that the diffusor 19 disposed at the output of the shut-off valve 10 is formed into the exit of the valve and thus forms a unit therewith.

We claim:

1. Valve assembly for a pressurized carbonated liquid in an automatic beverage dispenser including a shut-off valve and an expansion device formed as a conical diffusor with a hollow interior connected to the shut-off valve downstream therefrom in flow direction of the liquid in the dispenser, comprising an expansion cone disposed in the diffusor and having a taper corresponding substantially to that of the diffusor, said expansion cone having a threaded section at said base thereof, and said outlet of the diffusor being formed with an internal thread wherein said threaded section is screwable, said threaded section having a free end formed with means for receiving a tool therein in a positive locking manner, said expansion cone being adjustably displaceable in axial direction thereof, the conical diffuser being disposed in an outlet of the valve assembly directly downstream from the shut-off valve and comprising a nipple-like insert formed with an external thread and having a shoulder substantially at the middle thereof, said expansion cone being formed with a plurality of bores extending from an exterior surrounding surface thereof to a central interior bore extending from a base thereof.

* * * * *